Oct. 23, 1928.
L. L. LOCKROW
1,688,932
ELECTRICAL MEASURING APPARATUS
Filed Sept. 14, 1926
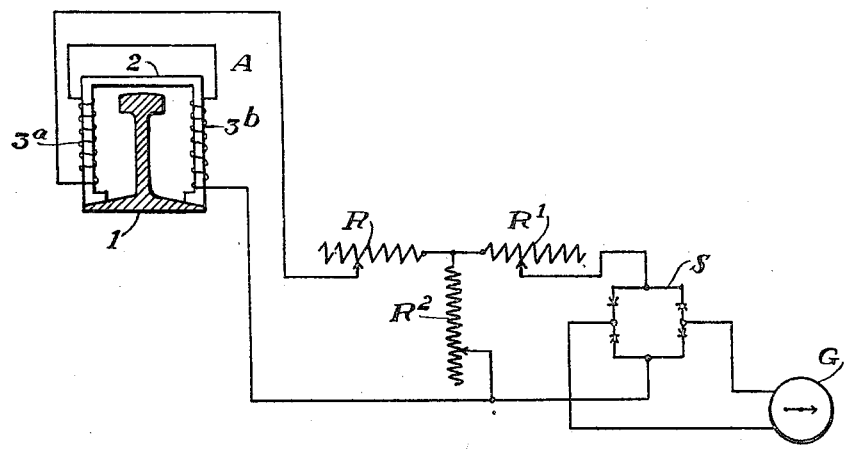
INVENTOR:
L. L. Lockrow,
by A. L. Venall
His attorney Patented Oct. 23, 1928.

1,688,932

UNITED STATES PATENT OFFICE.

LAURICE L. LOCKROW, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA.

ELECTRICAL MEASURING APPARATUS.

Application filed September 14, 1926. Serial No. 135,399.

My invention relates to electrical measuring instruments, and has for an object the provision of means for compensating for the effect of temperature and other variations on the readings given by such apparatus.

I will describe one form of apparatus embodying my invention, and will then point out the novel features thereof in the claim.

The accompanying drawing is a diagrammatic view showing one form of apparatus embodying my invention.

Referring to the drawing, the reference character A designates a source of alternating current. As here shown, this source comprises a core 2 provided with windings $3^a$ and $3^b$, which core is so shaped and proportioned that it may be placed over the head of a track rail 1 and will rest on the base of such rail. The rail 1 carries alternating signaling current or alternating train control current, and, consequently, when the core 2 is placed in the position shown in the drawing, an alternating current is induced in the windings $3^a$ and $3^b$, which windings are connected in such direction that the currents induced therein are additive.

The terminals of the secondary windings $3^a$ and $3^b$ are connected with the galvanometer G through a full-wave rectifier S, so that the deflection of the galvanometer needle is dependent upon the amount of current flowing in windings $3^a$ and $3^b$. The rectifier S is made up of a plurality of units each consisting of copper having cuprous oxide formed thereon and integral therewith. A rectifier of this type is disclosed and claimed in Letters Patent of the United States No. 1,640,335, granted to Lars O. Grondahl August 23, 1927, for uni-directional current carrying devices.

When a rectifier of the copper oxide type is connected across a transformer secondary and is used for supplying current to a galvanometer, the indications given by the galvanometer depend, among other things, on the rectification ratio of the rectifier and on the ratio between the impedance of the rectifier and galvanometer combination and the impedance of the transformer secondary. When the temperature changes, both of these relations are changed. If the temperature rises, the resistance of the rectifier decreases and the resistance of the transformer secondary increases. The rectification ratio of the rectifier also changes. Since the power that is available for the galvanometer depends upon the relation between the output impedance of the transformer and the impedance of the circuit connected to it, it is possible to choose such a value for the transformer impedance that the effect of changes in temperature will be partially compensated. That is, since the rectifier is more efficient at low temperatures than it is at high temperatures, compensation can be obtained by adjusting the circuit constants so that the rectifier receives a greater portion of the total power at high temperatures than it does at low temperatures. If the apparatus consisting of the transformer, rectifier and galvanometer were to be used over only one range, the compensation just referred to is all that would be necessary for many purposes. The galvanometer can be used for other ranges of current by providing shunts, but if this is done, the relation between the impedance of the transformer and the impedance of the rectifier is destroyed, with the result that the temperature compensation is lost.

In accordance with my invention, I provide a circuit in which the output of the transformer secondary can be shunted so as to get several current ranges and still maintain the temperature compensation the same as in the simple circuit referred to hereinbefore. I accomplish this by arranging shunts and series resistances in such manner that the transformer secondary is always feeding current into the same impedance and so that the circuit connected to the rectifier always has the same output impedance.

Referring again to the drawing, an impedance $R^2$ is interposed between the transformer secondary and the rectifier S, and is connected in multiple with both the secondary and the rectifier. A second impedance R is interposed between the impedance $R^2$ and one terminal of the transformer secondary. A third impedance $R^1$ is interposed between the impedance $R^2$ and one terminal of the rectifier S. As here shown, all three of the impedances R, $R^1$ and $R^2$, are adjustable resistances. These resistances are manipulated in such manner that $R^1 + R^2$ is always a constant value, and that $R + R^2$ is, likewise, always a constant value. The value of $R^1 + R^2$ is chosen so that it is substantially equal to the resistance of the transformer secondary, and the value of $R+R^2$ is so chosen that it is substantially equal to the combined resistance of rectifier S and galvanometer G. The result of this is that the transformer secondary is feeding into the same impedance as in the simple circuit referred to above, and that the rectifier S is fed from a circuit that has the same resistance as the circuit from which it would receive its power in the simple arrangement hereinbefore referred to.

An illustration of the values of resistances $R$, $R^1$ and $R^2$, is given in the following table:

| Rail current range | R | $R^2$ | $R^1$ |
|---|---|---|---|
| 0.16– 0.5 ampere | 0 | ∞ | 0 |
| 0.5 – 1.6 amperes | 165 | 137 | 63 |
| 1.6 – 5.0 amperes | 261 | 41 | 159 |
| 5.0 –16 amperes | 290 | 11 | 189 |
| 16 –50 amperes | 290 | 3 | 197 |

It will be noted that in this table the sum of R and $R^2$ is approximately constant, and that also the sum of $R^1$ and $R^2$ is approximately constant.

By means of my invention the number of calibration curves required for a given range of rail current may be reduced. It will be noted from the foregoing table that two calibration curves are sufficient for a range of rail current from .16 ampere to 50 amperes.

Although I have herein shown and described only one form of apparatus embodying my invention, it is understood that various changes and modifications may be made therein within the scope of the appended claim without departing from the spirit and scope of my invention.

Having thus described my invention, what I claim is:

In combination, a transformer, a full wave rectifier having its input terminals connected with the secondary of said transformer and having the characteristic of varying in resistance with variations in the temperature at which it operates, a galvanometer connected with the output terminals of said rectifier, an impedance $R^2$ connected in multiple with said secondary and also with the input terminals of said rectifier, an impedance R interposed between said impedance $R^2$ and one terminal of said secondary, and an impedance $R^1$ interposed between said impedance $R^2$ and one of the input terminals of said rectifier, said impedances being so chosen that the sum of impedances $R^2$ and R is constant and is substantially equal to the combined impedance of the rectifier and the galvanometer, and that the sum of impedances $R^2$ and $R^1$ is constant and is substantially equal to the effective resistance of said transformer secondary.

In testimony whereof I affix my signature.

LAURICE L. LOCKROW.